July 29, 1969   G. J. GANLEY   3,458,678
CONTROL APPARATUS

Filed Jan. 25, 1968   2 Sheets-Sheet 1

INVENTOR.
GREGORY J. GANLEY
BY Charles J. Ungemach
ATTORNEY

July 29, 1969  G. J. GANLEY  3,458,678
CONTROL APPARATUS
Filed Jan. 25, 1968  2 Sheets-Sheet 2
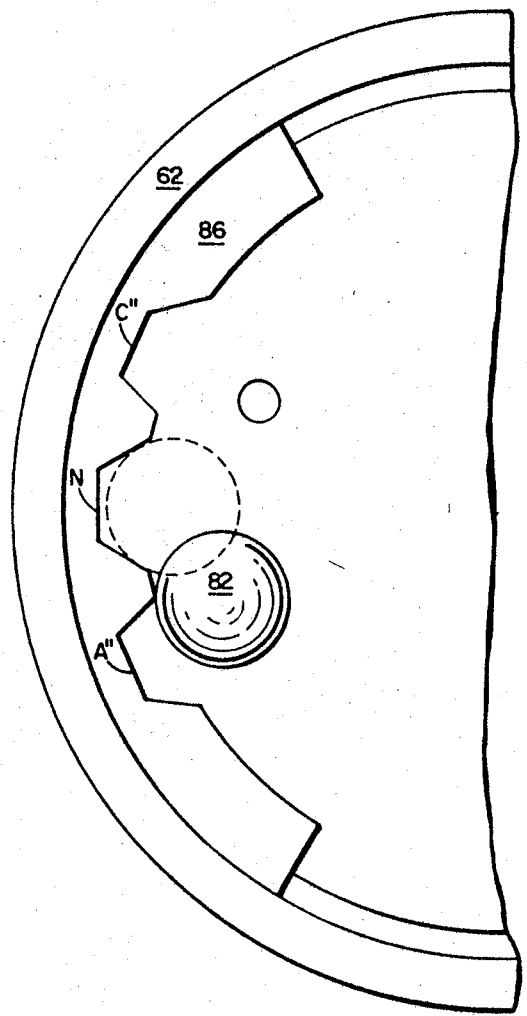
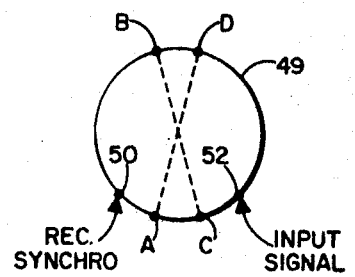
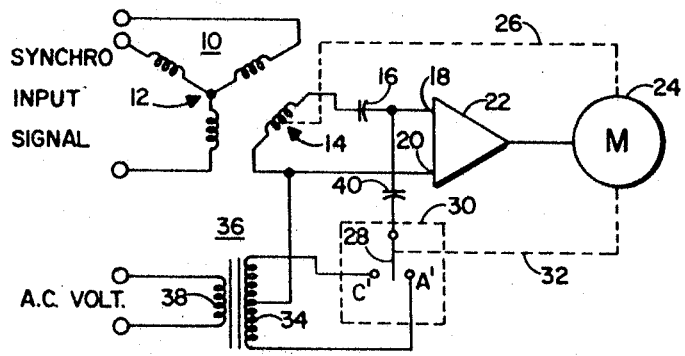
INVENTOR.
GREGORY J. GANLEY
BY Charles J. Ungemach
ATTORNEY United States Patent Office 3,458,678
Patented July 29, 1969

3,458,678
CONTROL APPARATUS
Gregory J. Ganley, Minneapolis, Minn., assignor to Honeywell Inc., Minneapolis, Minn., a corporation of Delaware
Filed Jan. 25, 1968, Ser. No. 700,566
Int. Cl. H01h 3/34, 7/08
U.S. Cl. 200—166                                    3 Claims

ABSTRACT OF THE DISCLOSURE

A single pole double throw switch having a detent mechanism which provides positive action when the switch is thrown.

Background of the invention

The invention is in the field of switches that incorporate detent mechanisms. Specifically, the invention is a positive action single pole double throw switch particularly designed for use in a servo system with synchro rebalance.

Summary

In a servo system with synchro rebalance a condition can arise where the system will not reach its balanced condition (null) if mechanical stops are used in the system. The system includes an input receiver synchro and a servo rebalance motor. The relative positions of the input signal and the receiver synchro may be such that the servo rebalance motor will drive the receiver synchro up against a first mechanical stop and the system cannot be nulled. When this happens a single pole double throw switch is actuated just prior to contacting the mechanical stop which causes a fixed signal to be applied to the system reversing the servomotor. The fixed signal is applied to the system until the receiver synchro is driven almost to a second mechanical stop and the switch is deactuated. The system is then able to balance itself in response to the normal input signal. If the receiver synchro has originally been driven towards the second stop rather than the first stop (opposite direction of rotation) the single pole double throw switch would have been thrown to its second position and a fixed signal of opposite polarity would have been applied to the system causing the servomotor to run in the opposite direction.

Brief description of the drawings

FIGURE 3 is a diagram of the detent mechanism shown in the position at which self actuation occurs;

FIGURE 4 is a schematic diagram of a servo system with synchro rebalance, including a single pole double throw switch; and FIGURE 5 is a diagram called a phasing circle which illustrates the relationship between the input signal, the receiver synchro, and the mechanical stops in the system.

Description of the preferred embodiment

Figure 1:
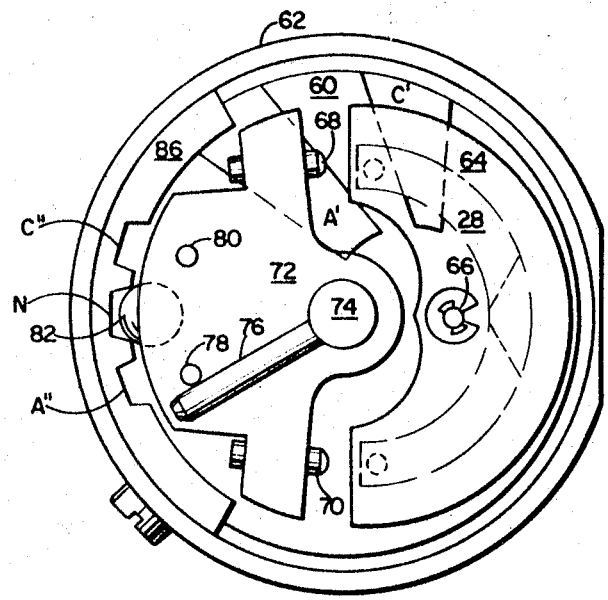
FIGURE 1 is a top view of the single pole double throw switch.

FIGURE 4 is a schematic diagram of a synchro rebalance servo system. The servo system includes a receiver synchro 10 having stator windings 12 and a rotor winding 14. One end of rotor winding 14 is tied to a first input terminal 18 of an amplifier 22 by means of a series coupling capacitor 16. The other end of winding 14 is connected to a second input terminal 20 of amplifier 22. The output of amplifier 22 drives a servomotor 24. The output means of servomotor 24 is mechanically connected to rotor winding 14. This mechanical connection is shown as a dashed line 26. The output means of motor 24 is also mechanically connected to a contactor 28 of a single pole double throw switch 30. The mechanical connection betweeen the output means of motor 24 and contactor 28 is shown as a dashed line 32. Switch 30 also has contacts C' and A'. Contact C' is connected to one end of a secondary winding 34 of transformer 36'. Contact A' is connected to the other end of winding 34. Winding 34 has a center tap which is connected to input terminal 20 of amplifier 22. Transformer 36 has a primary winding 38 which is connected to an AC voltage source. Contactor 28 of which 30 is connected to input terminal 18 of amplifier 22 by a series capacitor 40.

Thus when contactor 28 makes with contact A' or C' a voltage signal is applied to the input of amplifier 22 which causes motor 24 to be driven in one direction or the other depending upon whether contact A' or C' is contacted.

In a servo system with synchro rebalance such as the one shown in FIGURE 4 a condition can arise where the system will not reach a balanced condition or null if mechanical stops are used in the system. The condition preventing balance will be explained with reference to FIGURE 5. FIGURE 5 is a diagram of a phasing circle 49. Points A and C located on the phasing circle represent the mechanical stops in the system. Assume that the rotor winding 14 of synchro 10 is at a point 50 on the phasing circle. Point 50 is located a short distance clockwise from point A. Note that point C is located a short distance counterclockwise from point A. Assume that the input signal to the stator 12 of synchro 10 is located at a point 52 on the phasing circle a short distance counterclockwise from point C. A situation such as that shown in FIGURE 5 often occurs when the servo system is first turned on. The distance between point 50 and point 52 represents an error signal. The error signal is generated by winding 14 in synchro 10. Motor 24 will drive the rotor 14 of synchro 10 towards the mechanical stop A. Thus, point 50 moves towards point A. The space A–C represents the mechanical stop in the system. The synchro receiver 10 cannot pass point A to reach the null position corresponding to point 52. If a special circuit is not used, receiver synchro 10 will stay at point A until the input signal at point 52 moves counterclockwise to within 180 degrees of point A. Points B and D are located on the phasing circle diametrically opposed to points C and A respectively. Thus, the receiver synchro 10 will stay at point A until the input signal at point 52 moves counterclockwise to a point between points D and A.

The circuit including switch 30 provides synchronization for the condition described in FIGURE 5. Switch 30 is normally in the open position, as shown, with contactor 28 midway between contacts C' and A'. Shortly before the receiver synchro 10 reaches the mechanical stop A contactor 28 contacts contact C' closing a circuit and applying a signal to the amplifier 22 which causes servomotor 24 to reverse. When contactor arm 28 contacts contact A' the voltage developed across the lower half of secondary winding 34 of transformer 36 is applied to the input terminals of amplifier 22. This reversing signal to motor 24 may be applied in a variety of ways. The reversing signal must be applied to motor 24 until the receiver synchro 10 at least reaches point B. The reversing signal can be removed at any place between points B and C. In this particular case the reversing signal is removed shortly before the receiver signal reaches point C.

The invention concerns the method of actuating switch 30. It is necessary that switch 30 be positively positioned in three positions, i.e., the neutral position as shown, position A', and position C'. Positive positioning is accomplished by the mechanism shown in FIGURES 1, 2, and 3.

Figure 2:
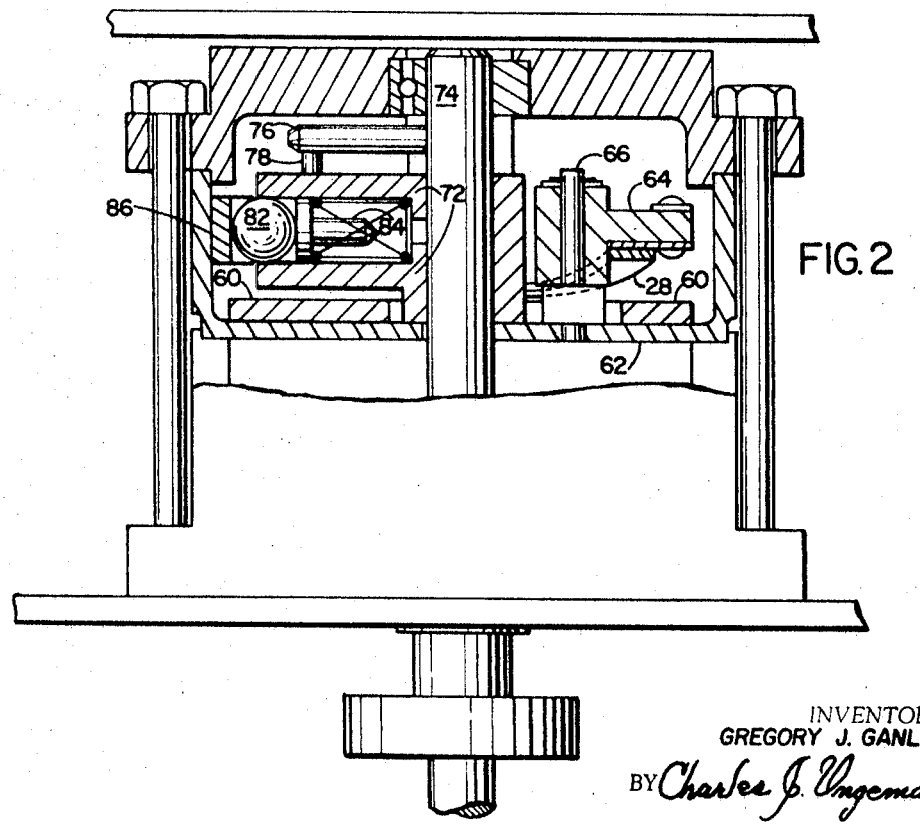
FIGURE 2 is a cut-away side view of the single pole double throw switch.

In FIGURE 1, contacts A' and C' are mounted on a sector 60. Sector 60 is shown more clearly in FIGURE 2. Sector 60 is mounted on a base member 62. A contactor plate 64 carries contactor 28 on its underside. Plate 64 rotates about a pin 66 mounted in base member 62. Plate 64 is free to rotate until the edge of contactor plate 64 contacts either a pin 68 or a pin 70 mounted on opposite shoulder areas of an actuator plate 72. With plate 72 as shown, pins 68 and 70 prevent the rotation of contactor plate 64 in such a way that contactor 28 cannot contact either contact A′ or contact C′. Plate 72 rotates about a shaft 74. Shaft 74 is part of the mechanical connection means shown as dashed line 32 in FIGURE 4. An arm 76 is attached to shaft 74. Arm 76 forms a right angle with shaft 74. Arm 76 is rotatable in a plane parallel to the plane of actuator plate 72. Arm 76 is shown contacting a pin 78 which is mounted on plate 72 and is perpendicular to plate 72. A second pin 80 is also mounted on and perpendicular to plate 72.

When the non-synchronized condition shown in the phasing circle diagram of FIGURE 5 occurs, arm 76 will be driven counterclockwise towards pin 80. When arm 76 contacts pin 80, plate 72 is caused to rotate in a counterclockwise direction. Plate 72 rotates about the same center as shaft 74 and is free to rotate about shaft 74. Pin 70 on the lower shoulder of plate 72 will contact contactor plate 64. As arm 76 continues to rotate in a counterclockwise direction, a detent mechanism in the switch begins to operate.

The detent mechanism comprises a round ball 82 mounted in a hollow portion of plate 72. Ball 82 is biased by a spring loaded mechanism 84 within plate 72. Mounted opposite actuator plate 72 and ball 82 is a detent plate 86 having three notches or detents C″, N, and A″. As shown in FIGURE 1, ball 82 is in detent N.

As arm 76 continues to rotate in a counterclockwise direction after contacting pin 80, ball 82 rises out of detent N and moves towards detent A′ of detent plate 86. Note that only a single pin, i.e., pin 78 would be necessary if the dimensions of arm 76 are made large enough.

A unique feature of this switch is the interaction between ball 82, detent plate 86, wiper arm or contactor 28, and contacts A′ and C′ of sector 60. Contactor or wiper arm 28 remains in the neutral poistion as shown in FIGURE 1 until ball 82 is partially into detent A″. The condition where ball 82 is partially into detent A″ is shown in FIGURE 3. Spring mechanism 84, shown in FIGURE 2, forces ball 82 to the left and against detent plate 86. When it enters any detent ball 82 reaches a self-actuating position as shown in FIGURE 3. In other words, ball 82 will move into detent A″ and cause counterclockwise rotation of plate 72 independent of any co-action between arm 76 and pin 80. In this way, positive switching action is provided.

When ball 82 is slightly passed the self-actuating position as shown in FIGURE 3, contactor or wiper arm 28 contacts contact A′ closing the circuit between contact A′ and wiper arm 28. It can be seen in FIGURE 4 that this causes the lower half of the secondary winding 34 of transformer 36 to be placed across the input terminals of amplifier 22. In this way, a signal is applied to motor 24 causing it to reverse its direction of rotation. When motor 24 reverses, the contact between pin 80 and arm 76 is broken and arm 76 begins rotating clockwise. As stated before, actuator plate 72 continues to rotate a slight amount in a counterclockwise direction due to the positive action of the detent mechanism. Thus, wiper arm 28 is securely driven onto contact A′ and positive switching action is provided. Obviously other positive action mechanisms, e.g., an overcenter mechanism could be used.

All servo systems such as the one shown in FIGURE 4 have some overtravel. This overtravel can be used to provide positive positioning, but the overtravel is unpredictable and usually changes with the age of the system, ambient temperature, etc. Therefore, this inherent system overtravel cannot be relied upon to provide positive positioning of wiper arm 28. Large amounts of overtravel will not affect the switching mechanism in this invention if the overtravel does not exceed the travel associated with the self-actuation of the detent mechanism.

After wiper arm 28 makes contact with contact A′, the motor 24, the rotor 14 of synchro 10, shaft 74, and arm 76 rotate in a clockwise direction. Clockwise rotation continues until arm 76 contacts pin 78 at which time ball 82 is in detent A″ and wiper arm 28 is positively positioned on contact A′. As the counterclockwise rotation of arm 76 continues, force is applied to pin 78 causing plate 72 to begin rotating clockwise. Due to the clockwise rotation of plate 72, ball 82 rises out of detent A″ and eventually reaches a self-actuating position relative to detent N. During the clockwise rotation of arm 76 wiper arm 28 does not move because although pin 70 has moved away from contactor plate 64 pin 10 has not yet contacted plate 64. Pin 68 contacts plate 64 either shortly before or shoftly after ball 82 reaches its self-actuating position with respect to detent N. However, wiper arm 28 does not break contact with contact A′ until after the self-actuating position of ball 82 with respect to detent N is reached. The detent action of ball 82 in detent N causes a positive disconnection between wiper arm 28 and contact A′. After this disconnection wiper arm 28 is in the neutral position and the servo system returns to its normal mode of operation. With respect to FIGURE 5 this means that the synchro input signal at point 52 will cause the receiver synchro to move from a point corresponding to mechanical stop C a small displacement counterclockwise to point 52. The system is then at balance or null.

In other systems two separate toggle switches or limit switches, a relay, and a time delay, have been used to perform this synchronizing function. This invention provides a single switch which is more reliable, costs less, and requires less space than the schemes used in the other systems.

It is understood that the switching arrangement described is only illustrative of the application of the principles of the invention. Other arrangements may be devised by those skilled in the at without departing from the spirit and scope of the invention.

What is claimed is:
1. A switch comprising:
a base;
first and second electrical contacts mounted on the base;
a contactor assembly, including a wiper arm, free to move and mounted on the base so that the wiper arm can be positioned to contact either electrical contact;
an actuator plate mounted on the base and having neutral, first, and second positions;
pin means mounted on the actuator plate;
a positive action positioning mechanism associated with said actuator plate;
a rotatable shaft; and,
an arm means mounted on the shaft, sufficient rotation of the shaft causing the arm means to contact the pin means from a first or second direction depending on the direction of the shaft rotation and thereby imparting rotation to the actuator plate, rotating it from is neutral position to its first or second position depending upon the direction of rotation, the actuator plate in its neutral position acting as a stop, and preventing the contactor assembly from rotating and the wiper arm from contacting either the first or second contact, and in its first or second position moving the contactor assembly and thus the wiper arm into contact with the first or second electrical contact respectively.

2. A switch comprising:
a base;
first and second electrical contacts mounted on the base;
a contactor assembly, including a wiper arm, free to move and rotatably mounted on the base so that the wiper arm can be positioned to contact either electrical contact;
an actuator plate rotatably mounted on the base and having neutral, first, and second positions;
first and second pins mounted on the actuator plate;
a positive action detent mechanism associated with said actuator plate;
a rotatable shaft; and,
an arm mounted on the shaft, sufficient rotation of the shaft causing the arm to contact either the first or second pin mounted on the actuator plate, depending on the direction of the shaft rotation, and thereby impart rotation to the actuator plate, rotating it from is neutral position to its first or second position depending upon the direction of rotation, the actuator plate in its neutral position acting as a stop and preventing the contactor assembly from rotating enough for the wiper arm to contact either the first or second contact and in its first or second position moving the contactor assembly and thus the wiper arm into contact with the first or second electrical contact, respectively.

3. The apparatus of claim 2 wherein the detent mechanism comprises a spring loaded ball mounted on the actuator plate and a detent plate mounted opposite the actuator plate and having three notches corresponding to the neutral, first, and second poistions of the actuator plate, the three notches positioned opposite the ball.

References Cited
UNITED STATES PATENTS

| | | |
|---|---|---|
| 2,831,081 | 4/1958 | Mason. |
| 3,246,530 | 4/1966 | Swanson et al. _____ 200—66 |
| 3,260,805 | 7/1966 | Phil. |
| 3,271,643 | 9/1966 | Lingel _____ 318—18 |
| 3,311,718 | 3/1967 | Allison et al. |
| 3,359,383 | 12/1967 | Cryer. |

H. O. JONES, Primary Examiner

U.S. Cl. X.R.

318—18